United States Patent Office 3,530,173
Patented Sept. 22, 1970

3,530,173
CERTAIN ACIDS AND HYDRAZIDES
David Aelony, Minneapolis, Minn., assignor to General Mills, Inc., a corporation of Delaware
No Drawing. Filed Jan. 17, 1967, Ser. No. 609,770
Int. Cl. C07c 103/26
U.S. Cl. 260—519
20 Claims

ABSTRACT OF THE DISCLOSURE

Compounds of the formula

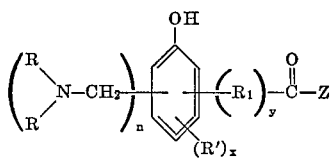

where Z is —OH or

and compositions comprising such compounds and epoxy resins. A representative acid is prepared by condensing dimethylamine, formaldehyde and salicylic acid. A representative hydrazide is prepared by reacting said acid with hydrazine. Such acids and hydrazides react rapidly with epoxy resins at elevated temperatures and yet are used to prepare mixtures or B-stage resins which are relatively stable at room temperature.

---

The present invention relates to certain novel acids and hydrazides and the use thereof as curing agents for epoxy resins. More particularly, it relates to certain amino substituted acids and hydrazides which are especially useful as curing agents for epoxies.

Epoxy resins are known to produce a number of valuable products and, particularly in the coating arts, the epoxy resins are known to produce infusible, insoluble coatings or films which when properly cured exhibit desirable properties such as toughness, thermal stability and the like. The known curing agents for such epoxy resins, however, have been found to leave something to be desired. For example, the common aliphatic polyamines react rapidly at room temperature and at elevated temperatures with epoxy resins. They therefore possess poor storage stability. In addition, since most of the compounds of this class are liquids, they are difficult to utilize in powder systems. Other agents that have been utilized are the amino triazines, anhydrides and aromatic diamines. These compounds, however, give moderate rates of reaction with epoxy resins at low and high temperatures and consequently cure rates are quite slow.

The acids and hydrazides of the present invention have the advantage of being compatible with epoxy resins to form compositions which are stable at room temperature. They can also be readily and easily reacted at elevated temperatures with epoxy resins and the reaction can be terminated prior to completion to provide relatively stable, homogeneous B-stage resins of high utility. Such systems can be finely divided to provide stable, homogeneous powders for use in coating a variety of substrates by such methods as spraying and fluidization thereof. The admixtures or B-stage resins, even though stable at ambient room temperatures, are rapidly cured when heated to elevated temperatures.

It is, therefore, an object of the instant invention to provide novel amino substituted acids and hydrazides.

Another object of the invention is to provide novel hardenable epoxy resin compositions.

Still another object of the invention is to provide novel partially cured, hardenable epoxy resin compositions.

A further object of the invention is to provide novel infusible, insoluble epoxy resin products.

Other and further objects, features and advantages of the present invention will become apparent to those skilled in the art from the following detailed disclosure thereof.

In general, the instant invention consists in new compounds having the idealized, general formula

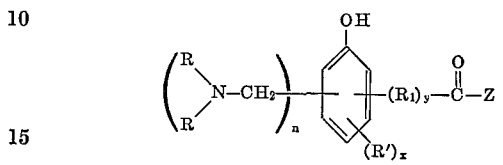

where R is an aliphatic radical of 1 to about 24 carbon atoms or an aryl group which may or may not be substituted such as with aliphatic groups to give an alkaryl group or an aralkyl group wherein the aryl group may or may not be substituted such as with additional aliphatic groups, R' is an aliphatic substituent containing from 1 to about 18 carbon atoms such as methyl, ethyl, propyl, butyl, pentyl, pentenyl, hexenyl, hexyl, 2-ethyl-hexyl, hexynyl, octyl, decyl, dodecyl, decenyl, decynyl and the like, $R_1$ is a straight or branched chain alkylene radical of 1 to 5 carbon atoms, Z is —OH or

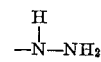

$n$ is 1 or 2, $y$ is 0 or 1, and $x$ is 0 to 4 minus $n$ with the proviso that the amino group or groups must be in a position ortho or para to the hydroxyl group on the ring. The R's may be the same or different. It is preferred that R, R' and $R_1$ are unsubstituted and that $x$ is 0 or 1. The present invention further consists in hardenable compositions prepared from such acids or hydrazides and epoxy resins and in infusible, insoluble resinous products prepared from such hardenable compositions.

The new acids of my invention are prepared by condensing a secondary amine, a phenolic acid and formaldehyde. Such condensation reaction can be illustrated as follows:

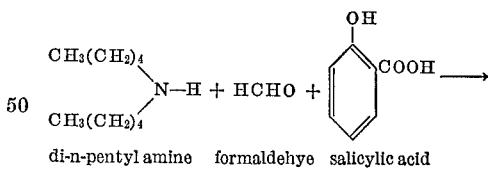

di-n-pentylamine   formaldehyde   salicylic acid

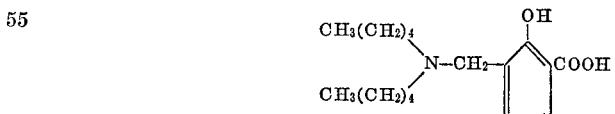

and/or

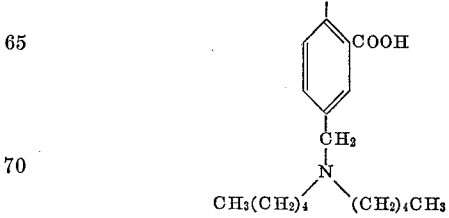

In addition, the use of an excess of the diamine and formaldehyde will yield some or a considerable amount of the di-amino substituted acid having the formula

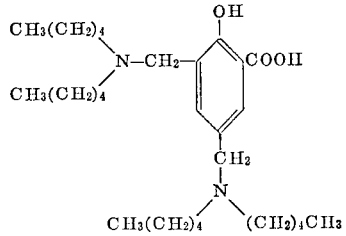

Of course, mixtures of the various compounds are also encompassed by the present invention.

Representative aliphatic secondary amines to be condensed to produce the new acids of the present invention are dimethyl amine, diethyl amine, dipropyl amine, dibutyl amine, dipentyl amine, dihexyl amine, dicyclohexyl amine, diheptyl amine, dioctyl amine, dinonyl amine, didecyl amine, diundecyl amine, didodecyl amine, dihexadecyl amine, dioctadecyl amine, dihexenyl amine, diheptenyl amine, dioctenyl amine, dihexadecenyl amine, dioctadecenyl amine, distearyl amine, dioleyl amine, dioctynyl amine, dioctadecynyl amine and the like. Said amines may be branched chained amines. Representative side chain substituents are methyl, ethyl, propyl, butyl, pentyl, hexyl, hexenyl, heptyl, heptenyl, heptynyl, octyl, octenyl, decyl and the like. The amines may have one or more side chains, may be mono-, di- or tri-unsaturated, and may be substituted with inert or non-interfering groups such as chlorine, nitro and the like.

Representative aryl secondary amines are diphenylamine and the substituted derivatives thereof, including the dialkaryl amines. Such amines can be represented by the formula:

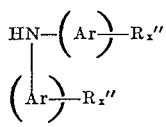

where Ar is the cyclic moiety, $R''$ is a substituent such as methyl, ethyl, propyl, butyl, pentyl, pentenyl, hexenyl, hexyl, 2-ethyl hexyl, hexynyl, octyl, decyl, decenyl, decynyl, dodecyl, and the like. Either the cyclic moiety or the substituent may contain inert or non-interfering groups such as halogen, nitro and the like. The aryl or alkaryl radicals preferably contain from about 6 to 40 carbon atoms and it is preferred that the cyclic moiety contains no more than about 2 substituents. It is even more preferred that the cyclic moiety contains 1 or less substituents. $x$ in the above formula is an integer representing the number of aliphatic substituents on the cyclic moiety.

A representative aralkyl secondary amine is benzyl amine. Such amines can be represented by the formula

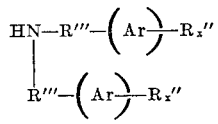

where $R''$ and $x$ have the meanings set forth above, $x$ preferably being 0 or 1 to about 4. $R'''$ is an alkylene radical which may be branched and preferably contains from about 1 to 10 carbon atoms. Either the cyclic moiety, $R'''$ or the substituent $R''$ may contain inert or non-interfering groups. The aralkyl radicals preferably contain from 7 to 40 carbon atoms and it is also preferred that the cyclic moiety contains less than two aliphatic substituents.

The preferred amines are the straight chain saturated aliphatic amines.

Representative phenolic acids are the hydroxybenzoic acids such as salicylic acid, the hydroxytoluic acids, hydroxyphenylacetic acid, the hydroxymesitylinic acids, hydroxyphenylpropionic acid and the like. The preferred phenolic acid is salicylic acid. The acids and hydrazides prepared therefrom have the idealized general formula:

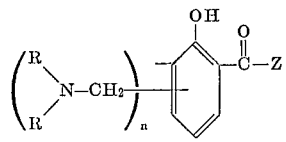

where R, Z and $n$ are as above defined.

The acids of the invention are prepared simply by mixing the phenolic acid, the secondary amine and formaldehyde. Preferably the reaction is carried out in an organic solvent such as an alcohol—i.e. isopropanol. Heat accelerates the reaction and thus it is especially preferred to carry out the condensation at temperatures of from about 20 to 100° C. Reflux conditions give entirely suitable results, While exactly equivalent amounts of the reactants can be used, it is preferred to employ an excess of the secondary amine and the formaldehyde. In such instances, a mixture of acids may result and, if desired, such mixtures can be distilled or fractionated to yield pure compounds.

The hydrazides of the present invention are prepared by reacting hydrazine with the acids as above prepared. This reaction can be illustrated as follows:

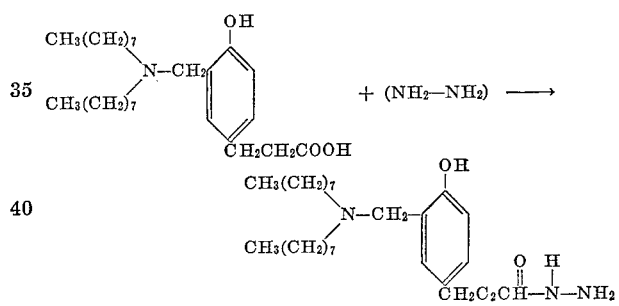

The reaction is preferably carried out using aqueous hydrazine of high concentration—i.e. 97% hydrazine by weight. It is also preferred to carry out the reaction in the presence of an organic solvent, preferably a lower aliphatic alcohol such as methanol. While the reaction can be completed at room temperature, higher temperatures on the order of 80 to 110° C. are preferred. Reflux conditions are especially preferred.

The following specific description illustrates the preparation of the acids and hydrazides of the present invention.

EXAMPLE 1

One hundred thirty-eight grams of salicylic acid were dissolved in 500 ml. isopropanol. Four hundred twenty milliliters of 40% by weight aqueous dimethylamine and then 162 ml. formalin (27% formaldehyde) were added. The reaction mixture was refluxed and agitated at 80° C. for about 16 hours (overnight). The reaction mixture was then evaporated in vacuum at 100° C. to yield 206.5 g. of product which was a viscous, light tan colored liquid. The product consisted mainly of a mixture of isomers of the formulae:

(a)

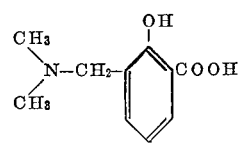

and (b)
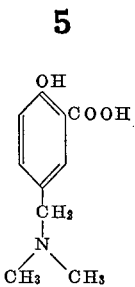

The product also contained a minor proportion of the following acid:
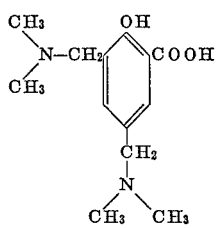

EXAMPLE 2

The hydrazide of the mixture of acids of Example 1 is prepared by reacting said acids with 97% hydrazine in the presence of methyl alcohol as a solvent. The resulting product consists mainly of a mixture of isomers of the formulae:

(a)
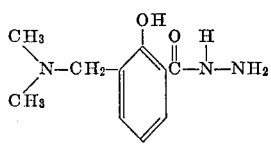

and (b)
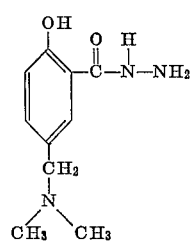

The product also contains a minor proportion of the following hydrazide:
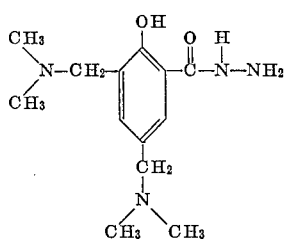

The following acids and hydrazides are prepared in a similar manner from the reactants indicated in parentheses. Only the ortho isomers are shown although it is understood that the para isomers and the di amino substituted compounds may also be present when the products are not fractionated.

EXAMPLE 3

(a) Acid (didodecylamine, formaldehyde, salicylic acid)
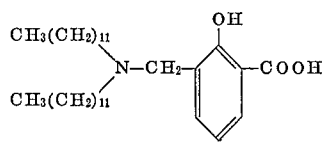

(b) Hydrazide (acid of (a), hydrazine)
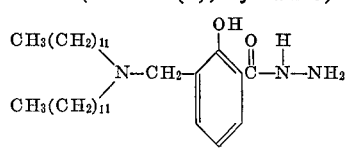

EXAMPLE 4

(a) Acid (dioctadecylamine, formaldehyde, salicylic acid)
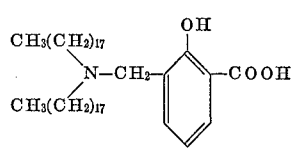

(b) Hydrazide (acid of (a), hydrazine)
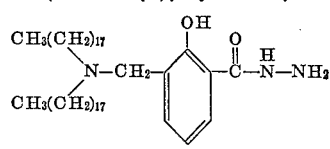

EXAMPLE 5

(a) Acid (diphenylamine, formaldehyde, salicylic acid)
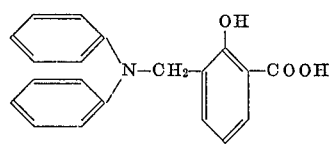

(b) Hydrazide (acid of (a), hydrazine)
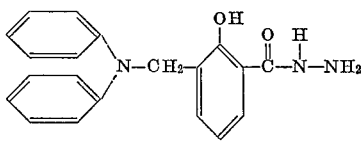

EXAMPLE 6

(a) Acid (dibenzylamine, formaldehyde, salicylic acid)
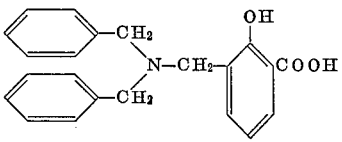

(b) Hydrazide (acid of (a), hydrazine)
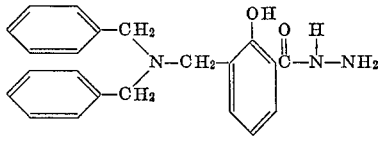

EXAMPLE 7

(a) Acid (dioctylamine, formaldehyde, hydroxyphenylacetic acid)
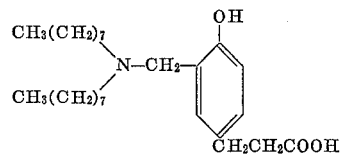

(b) Hydrazide (acid of (a), hydrazine)
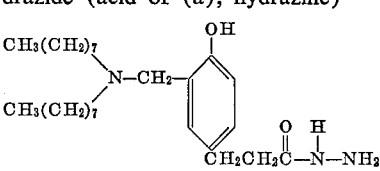

Of course in this example where an excess of formaldehyde and dioctyl amine are used, the product contains some diamino substituted acid and thence hydrazide, the substitution being ortho, ortho to the hydroxyl:

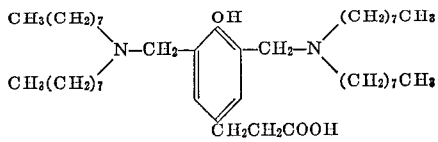

and

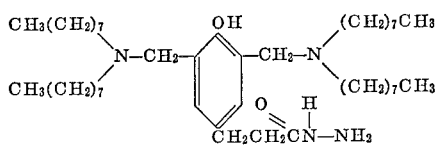

As indicated above the acids and hydrazides of the present invention are particularly useful as curing agents for epoxy resins. Any epoxy resin can be used in the present invention. Suitable resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl)propane (Bisphenol A), the resin having the following theoretical structural formula:

the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticica, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 6 to 22 carbon atoms. Illustrative thereof are oleic, linolenic, palmitoleic, and the like. Glycidyl esters of other polybasic acids, such as phthalic and sebacic acids, may be employed.

Other types of epoxy resins which may be used with the acids and hydrazides of the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as

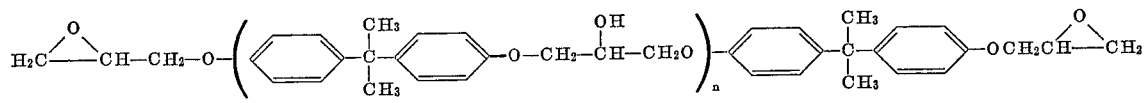

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

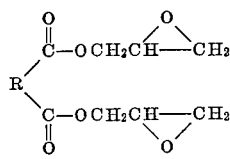

where R is the divalent hydrocarbon radical of dimerized unsaturated fatty acids.

The polymeric fat acids are well known materials, commercially available, which are the products prepared from epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxyphenyl) alkanes, such as 1,1,2,2-tetrakis (hydroxyphenyl) ethane, 1,1,4,4-tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

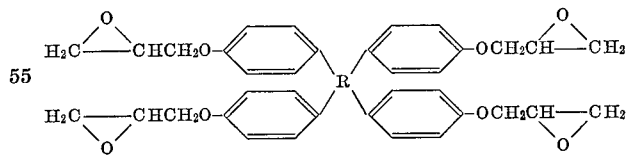

where R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following theoretical, idealized formula:

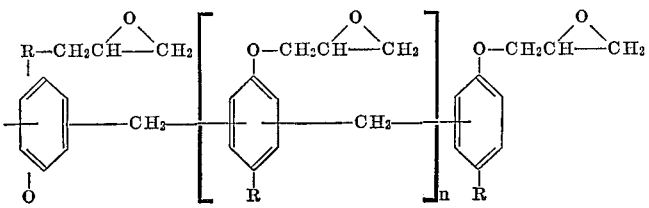

where R is selected from the group consisting of hydrogen and alkykl groups having up to 18 carbon atoms, and $n$ is an integer of from 1 to 10. Generally, $n$ will be an integer in excess of 1 to about 5.

In general, these resins are obtained by glycidification of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The glycidized novolac resin is formed in the well-known manner by adding the novolac resins to the epichlorohydrin and then adding an alkali metal hydroxide to the mixture so as to effect the desired condensation reaction.

In addition, other epoxy resins which may be used with the acids and hydrazides of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical idealized formula:

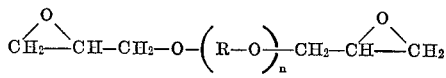

where R is an alkylene radical having from 2–5 carbon atoms and $n$ is an integer of from about 1 to about 50, R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Pat. 2,923,696.

In general, the epoxy resins may be described as those having terminal epoxide groups, or at least as having more than one epoxide group per molecule.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

The acids and hydrazides of the present invention are used in an amount sufficient to cure the epoxy resin to an insoluble and infusible polymer. Preferably, the acids and hydrazides are used in ratios by weight curing agent to epoxy resin of from about 1:99 to 75:25.

As indicated previously, the present invention consists of the acids and hydrazides, curable compositions of the acids or hydrazides and epoxy resins, partially cured compositions of the acids or hydrazides and epoxy resins and the ultimately prepared insoluble and infusible polymers prepared from the acids or hydrazides and epoxy resins. The curable compositions may be prepared simply by admixing the epoxy resin and the acid or hydrazide in the desired proportions. Such compositions are stable for extended periods of time at ambient room temperature and yet can be cured rapidly by heating to elevated temperatures. They may or may not be homogeneous.

The partially cured or B-stage resins may be prepared by admixing the acid or hydrazide and epoxy resin in the desired proportions, heating the reaction mixture to temperatures of about 30° C. to about 250° C., preferably 35° C. to 200° C., for a short period of time and terminating the reaction by cooling. By "B-stage" resin is meant a partially reacted product which will undergo little or no physical change during extended storage at ambient room temperatures and in which the reactants are homogeneously compatible in a one component, stable compound ready for final curing at elevated temperatures. In general, a "B-stage" resin will exist when the reaction is from about 5 to 90% complete.

The cured compositions of the present invention are prepared by heating the curable compositions or the partially cured compositions at elevated temperatures for a sufficient length of time to form insoluble and infusible polymers. Preferred heating temperatures are from about 300 to 450° F.

The acid- or hydrazide-epoxy resin compositions of my invention can also contain conventional additives such as pigments, fillers, flow control and anti-caking agents, accelerators, solvents and the like. In a preferred embodiment, the curable compositions or partially cured compositions are finely divided to form powders which find particular use in the coating of various substrates. Such powders give good edge coverage of sharp corners and thin panel edges. The B-stage powders are homogeneous, one-component materials which are stable at ambient room temperatures and yet can be rapidly cured at elevated temperatures. The same can be applied by the use of spray techniques or by forming a fluidized bed thereof. Normally the substrate to be coated is heated prior to being sprayed with the powder or being dipped into the fluidized bed. The powder then melts and coats the substrate. Subsequent curing, if necessary, can be in ovens heated to elevated temperatures. The powders of the present invention are especially valuable because of their quick cure characteristics.

The powders preferably contain flow control and anti-caking agents. Examples of such agents include amorphous silicas, dehydrated silica gels, various natural silicates such as attapulgite and kaolin clays, amorphous alumina, talc, and finely divided calcium carbonate. The described agents are preferably used in an amount sufficient to improve the flowout of the powder on melting with heat and/or to prevent fusing or caking of the powder at moderately high temperatures, i.e. 100–125° F. Obviosuly the amounts of said agents can vary considerably, depending on the particular agent used and the result desired. Generally, said agents will be used in amounts of about 2 to 50% by weight based on the weight of the epoxy resin and the hydrazide.

The acid- or hydrazide-epoxy resin compositions, and particularly the coating powders derived therefrom may also contain colorants, pigments, or fillers. Examples of suitable pigments include titanium dioxide (white finish), lead chromate (yellow), light and medium chrome yellow, chromium oxide (green), ultramarine blue, red iron oxide, and toluidine red. The amounts of said pigments can be varied widely to give different shades of different colors. Additionally, mixtures of different pigments may be used. Generally, said pigments are used in amounts of about 1 to 15% by weight based on the weight of the epoxy resin and hydrazide.

The acid- or hydrazide-epoxy resin compositions of this invention are useful not only in the coatings art but also in the preparation of laminates, moldings and the like. Preferred epoxy resins to be used are the glycidyl ethers of polyhydric phenols such as Bisphenol A.

The following specific description illustrates the acid- or hydrazide-epoxy resin compositions of my invention.

EXAMPLE A

To 8.0 g. of epoxy resin (a condensation product of Bisphenol A and epichlorohydrin having an epoxy equivalent weight of about 177) was added 2.0 g. of the acid as prepared in Example 1 above. No reaction of the epoxy and acid was evident at room temperature. The mixture was heated with stirring to 140° C. and upon reaching this temperature the reaction product (B-stage resin) was poured onto a Teflon sheet to cool. The cooled partially cured product was solid and homogeneous. Upon being subdivided and heated to 400° F., it gelled instantly indicating its high utility. Thus a relatively stable coating powder can be prepared from the partially cured resin and the same can be fluidized and applied to a heated substrate. The resulting film on the substrate gels instantly and is rapidly cured.

EXAMPLE B

Example A was repeated using 8.9 g. of the epoxy resin and 1.1 g. of the acid. The mixture was heated with stirring to 130° C. and then cooled as in Example A. The gel time at 400° F. of the resulting subdivided B-stage resin was 1.25 min. After 3 days storage at room temperature, the gel time at 400° F. was 1 min. After 10 days storage at room temperature, the gel time at 400° F. was 0.5 min. This example further indicates the high utility of the acid-epoxy compositions. Thus such compositions in B-stage form are relatively stable for extended periods of time at room temperature. They can accordingly be prepared well in advance of final curing and yet can be cured at elevated temperatures in a short period of time.

EXAMPLE C

Example A was repeated using 9.4 g. of the epoxy resin and 0.6 g. of the acid. The mixture was heated with stirring to 135° C. and then cooled as in Example A. The cooled product was a semisolid so it was reheated for 10 minutes in an oven at 150-170° C. After cooling, the resulting partially cured, homogeneous product was a low melting, brittle solid. When subdivided and heated to 400° F., it gelled instantly. Such product using a reduced amount of acid is also highly useful as a coating powder and the like.

EXAMPLES D-N

Example A is repeated using the acids and hydrazides of Examples 2-7. Essentially the same results are obtained.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A compound having the formula:

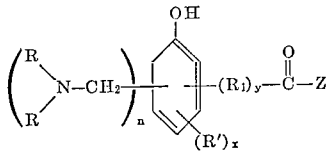

where R is selected from the group consisting of aliphatic hydrocarbon radicals of 1 to about 24 carbon atoms which may contain chloro and nitro substituents, the phenyl radical and alkaryl and arylalkyl radicals of 7 to about 40 carbon atoms wherein aryl is the benzene ring, R' is an aliphatic hydrocarbon radical of 1 to about 18 carbon atoms, $R_1$ is an alkylene radical of 1 to 5 carbon atoms, Z is —OH or

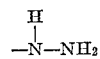

$n$ is 1 or 2, $y$ is 0 or 1, and $x$ is 0 to 4 minus $n$ with the proviso that the amino group or groups must be in a position ortho or para to the hydroxyl group.

2. The compound of claim 1 where Z is —OH.

3. The compound of claim 2 where R is methyl, $n$ is 1, $x$ is 0, $y$ is 0 and the resulting amino group

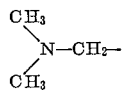

and acid group —COOH are both in a position ortho to the hydroxyl group.

4. The compound of claim 2 where R is methyl, $n$ is 1, $x$ is 0, $y$ is 0 and the resulting amino group

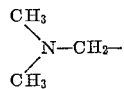

and acid group —COOH are in a position para and ortho, respectively, to the hydroxyl group.

5. The compound of claim 2 where R is methyl, $n$ is 2, $x$ is 0, $y$ is 0 and the resulting amino groups

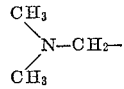

are in a position ortho and para and the carboxyl group —COOH is in a position ortho to the hydroxyl group.

6. The compound of claim 1 where Z is —OH and R is octyl.

7. The compound of claim 1 where Z is —OH and R is phenyl.

8. The compound of claim 1 where Z is —OH and R is benzyl.

9. The compound of claim 1 where $y$ is 1, Z is —OH and $R_1$ is ethylene.

10. The compound of claim 1 where Z is

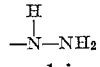

11. The compound om claim 10 where R is methyl.
12. The compound of claim 10 where R is octadecyl.
13. The compound of claim 10 where R is phenyl.
14. The compound of claim 10 where R is benzyl.
15. The compound of claim 10 where $n$ is 2 and $y$ is 1.
16. The compound of claim 1 where $x$ is 1 and R' is an aliphatic hydrocarbon radical of 1 to 12 carbon atoms.
17. The compound of claim 16 where R is phenyl.
18. The compound of claim 16 where R is benzyl.
19. The compound of claim 16 where R' is methyl and R is phenyl.
20. The compound of claim 16 where R' is methyl and R is benzyl.

References Cited

UNITED STATES PATENTS 2,944,071  7/1960  Pessolano et al. _____ 260—559

LORRAINE A. WEINBERGER, Primary Examiner

L. A. THAXTON, Assistant Examiner

U.S. Cl. X.R.

260—47, 559

UNITED STATES PATENT OFFICE
CERTIFICATE OF CORRECTION

PO-1050 (5/69)

Patent No. 3,530,173    Dated Sept. 22, 1970

Inventor(s) David Aelony

It is certified that error appears in the above-identified patent and that said Letters Patent are hereby corrected as shown below:

Column 4, line 44: the last line of the formula reading

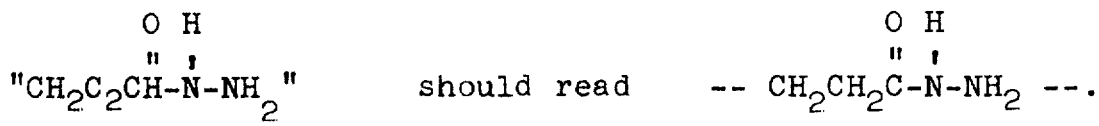

Column 8, line 67 to bottom of page: the left-hand portion of the formula reading

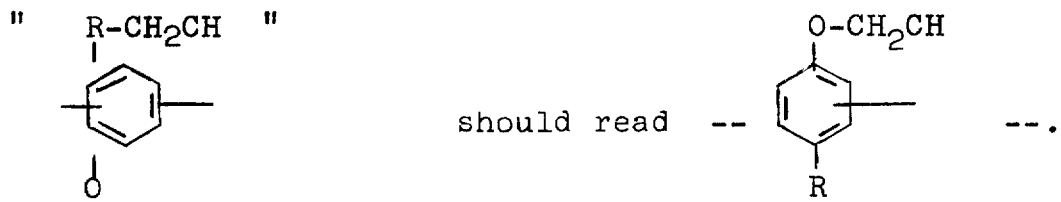

Column 11, line 30: after "acid-epoxy" insert -- resin --; lines 62-68: that portion of the formula reading

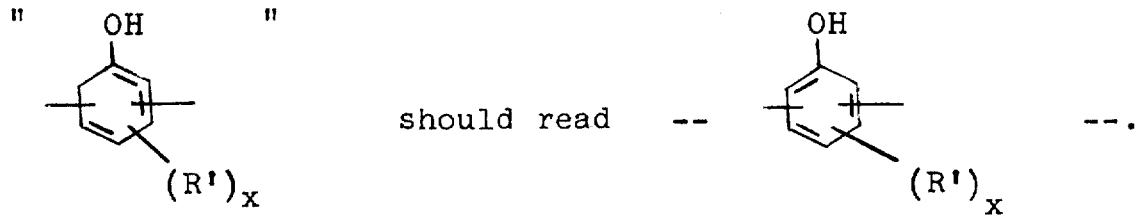

Column 12, line 49: "om" should read -- of --.

SIGNED AND SEALED
MAR 16 1971

(SEAL)
Attest:

Edward M. Fletcher, Jr.
Attesting Officer

WILLIAM E. SCHUYLER, JR.
Commissioner of Patents